Sept. 25, 1928.

A. BROADMEYER

INSPECTING APPARATUS

Filed April 28, 1926

Inventor

Albert Broadmeyer

By

Attorney

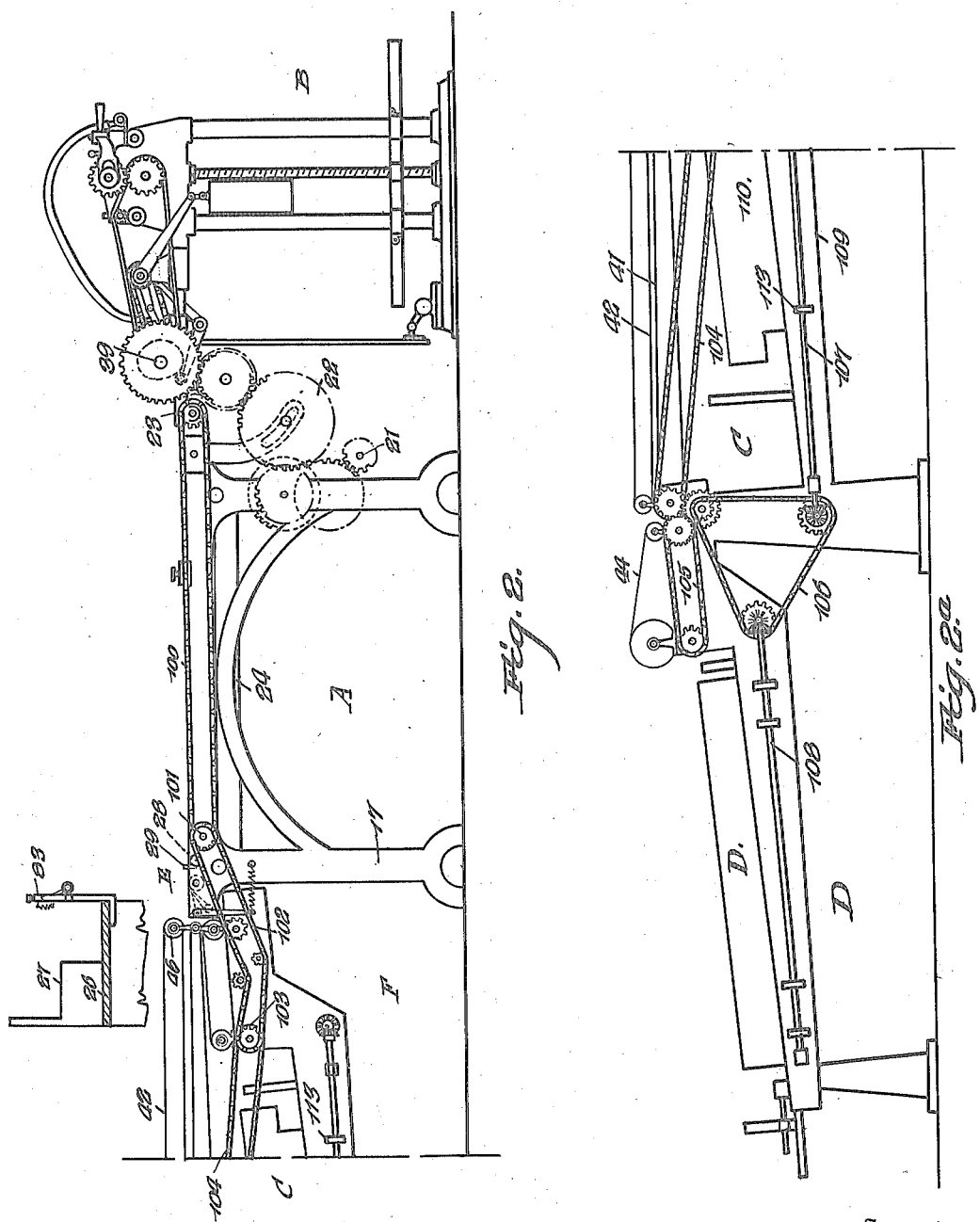

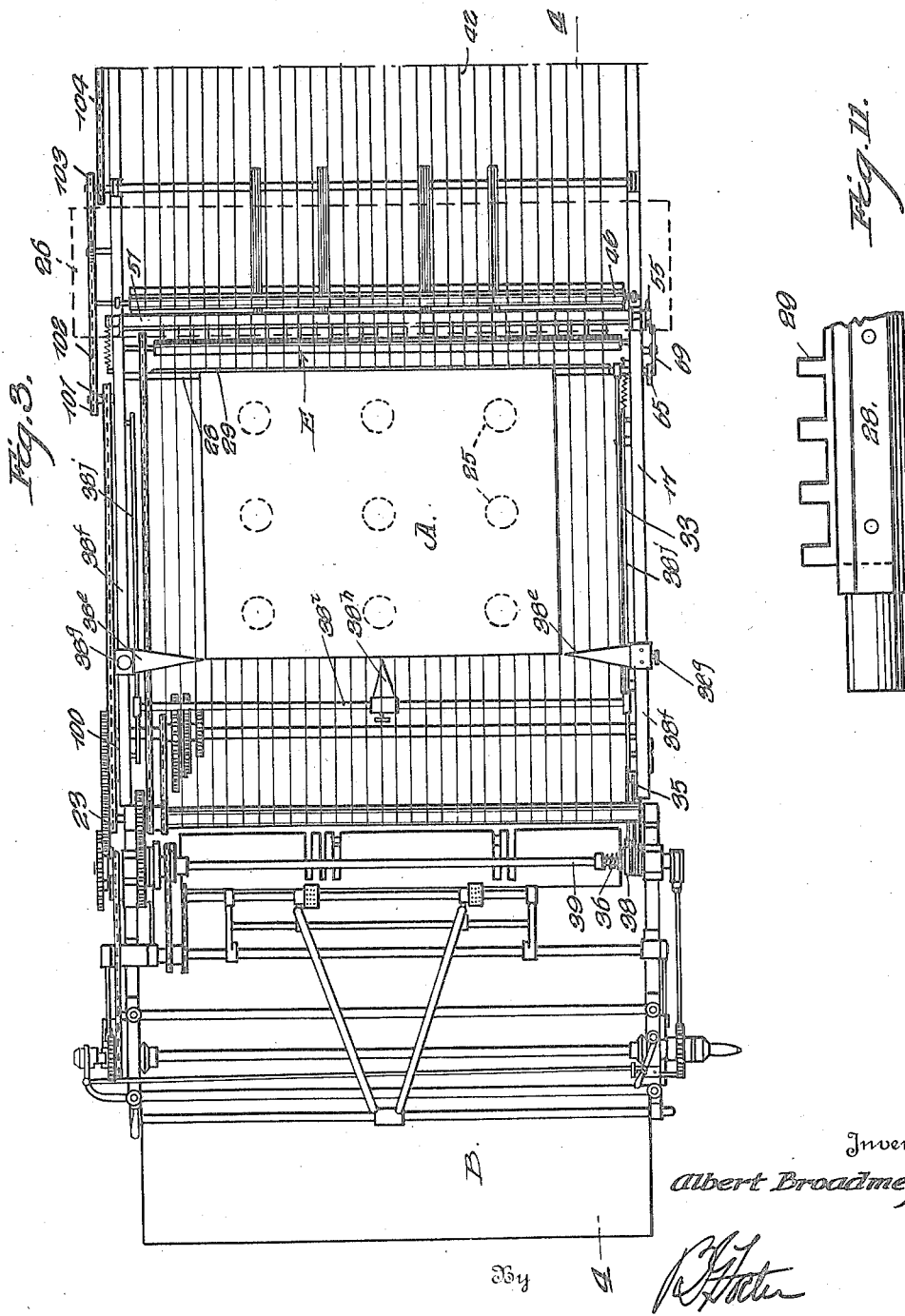

Sept. 25, 1928.  A. BROADMEYER  1,685,761
INSPECTING APPARATUS
Filed April 28, 1926  8 Sheets-Sheet 4
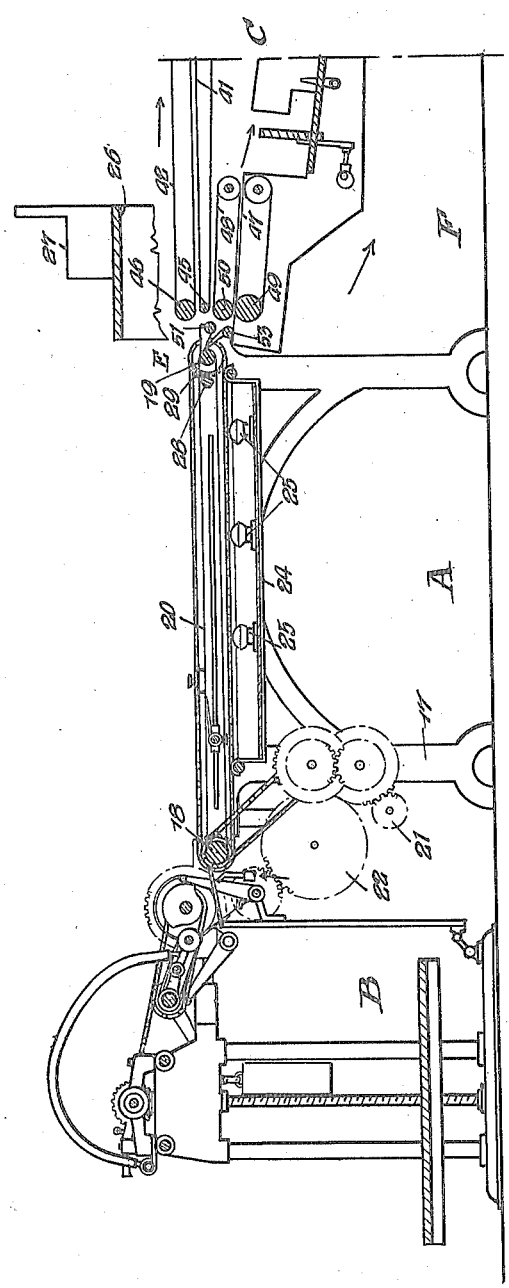
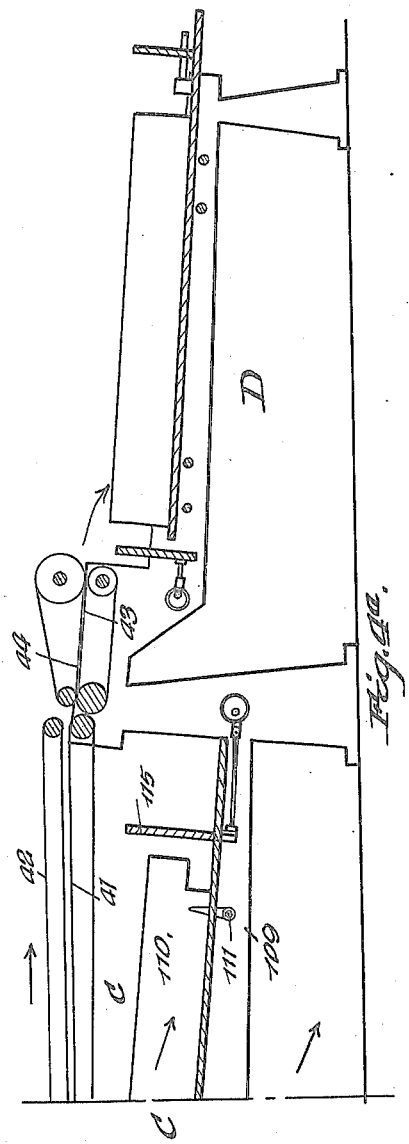
Inventor
Albert Broadmeyer
By
Attorney

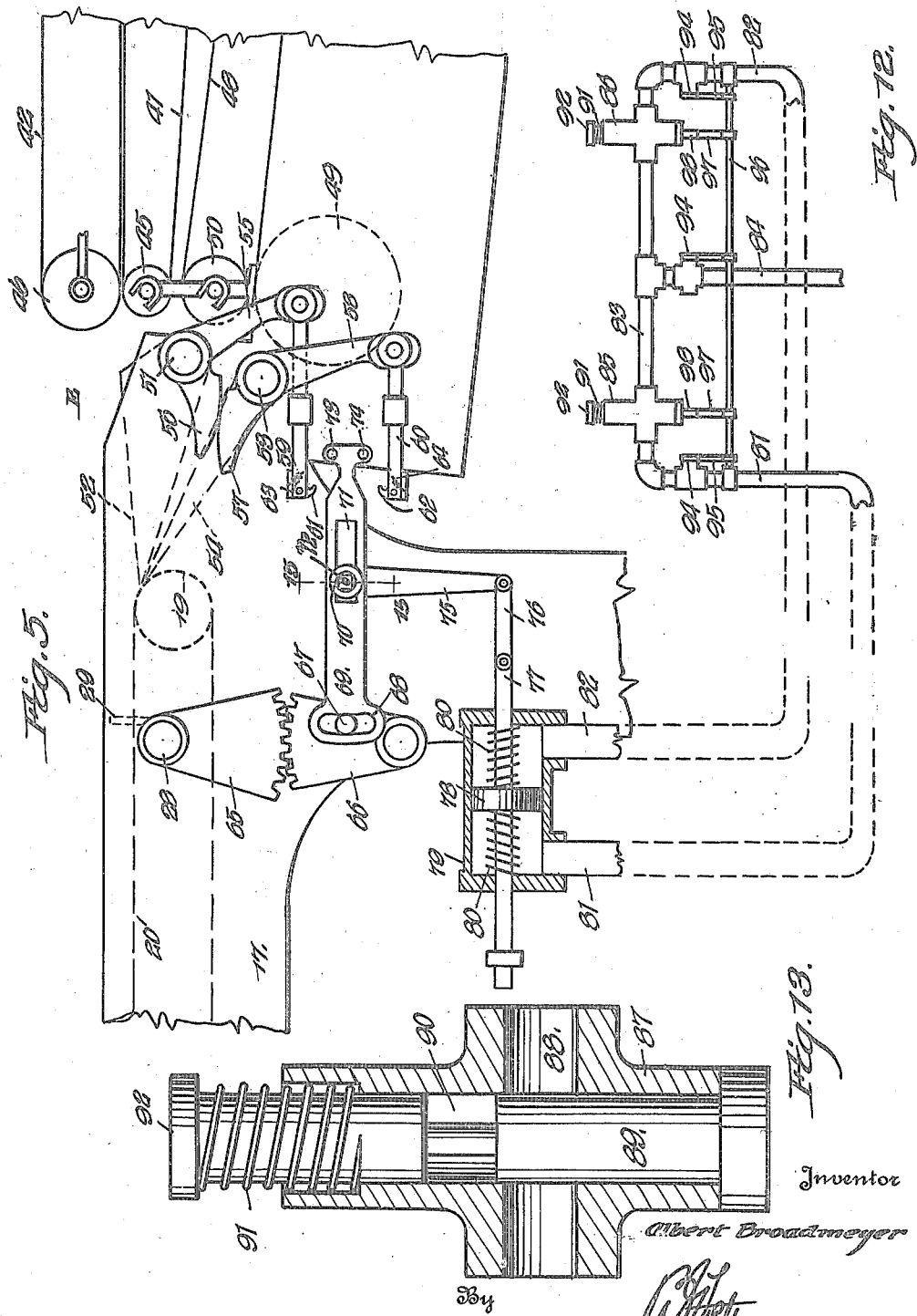

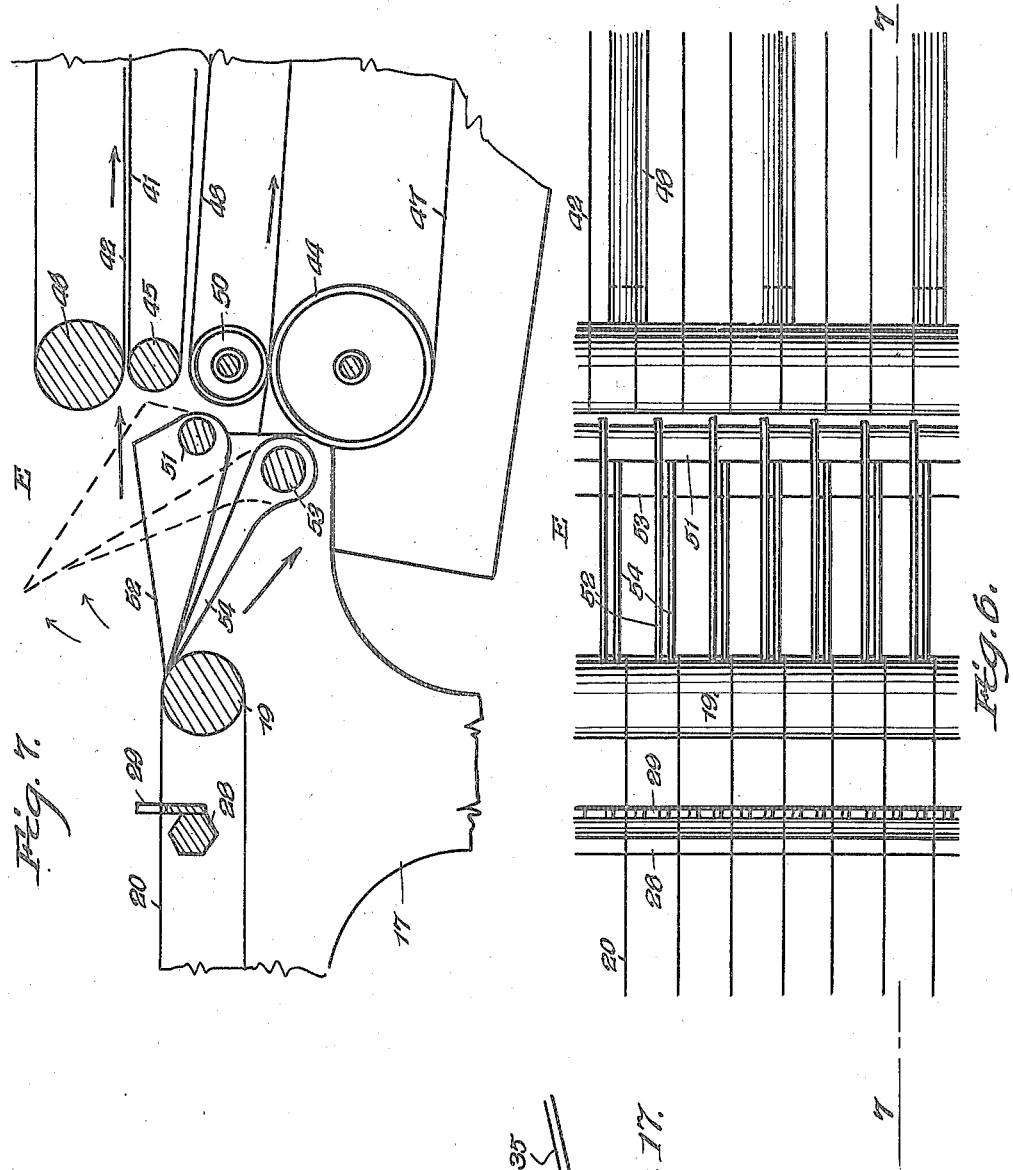
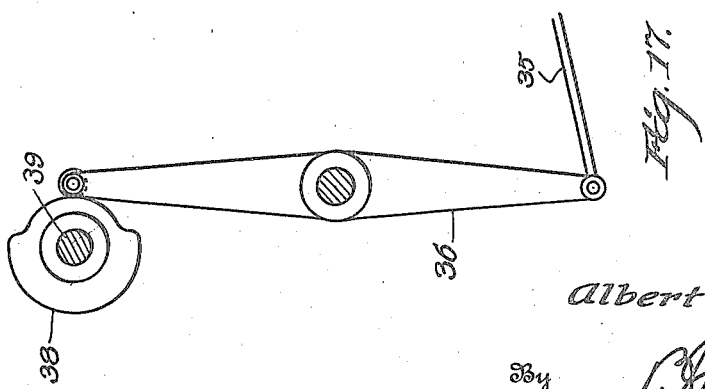

Sept. 25, 1928.  A. BROADMEYER  1,685,761
INSPECTING APPARATUS
Filed April 28, 1926    8 Sheets-Sheet 7
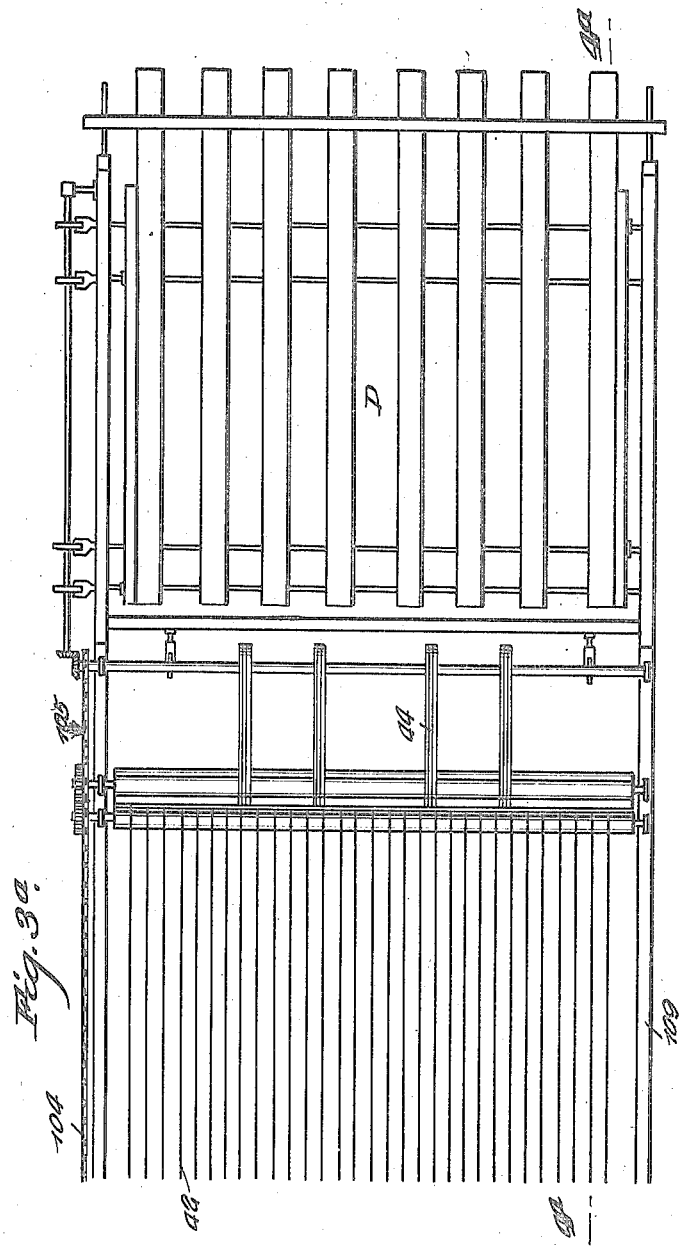
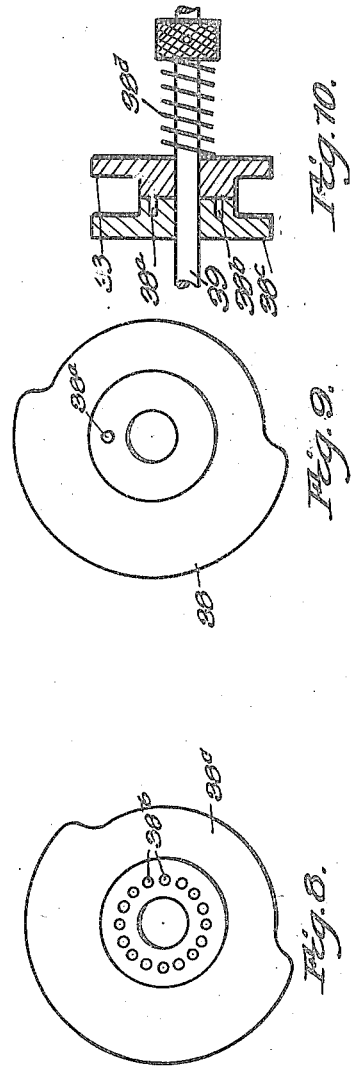
Inventor
Albert Broadmeyer
By
Attorney

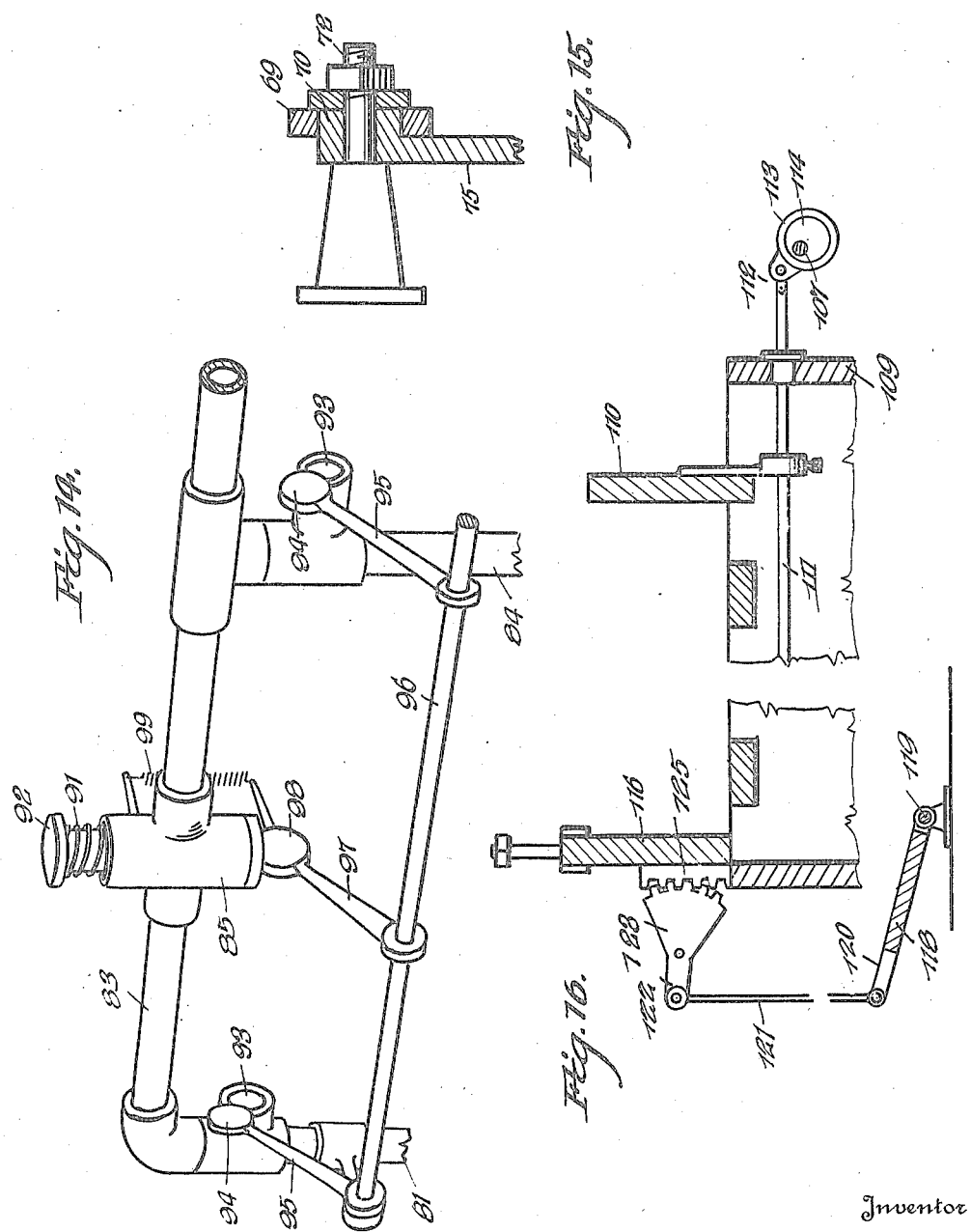

Patented Sept. 25, 1928.

1,685,761

UNITED STATES PATENT OFFICE.

ALBERT BROADMEYER, OF HARRISBURG, PENNSYLVANIA, ASSIGNOR TO THE W. O. HICKOK MANUFACTURING COMPANY, OF HARRISBURG, PENNSYLVANIA, A CORPORATION OF PENNSYLVANIA.

INSPECTING APPARATUS.

Application filed April 28, 1926. Serial No. 105,173.

The present invention relates to apparatus for inspecting sheets in order to note defects therein, and while particularly useful in inspecting large sheets of paper, may of course be employed for other purposes, particularly where the sheets are flexible.

The primary object of the invention is to provide means of an effective character that will successively deliver sheets to an illuminated field, so that the light will shine therethrough, and any defects either in the body of the sheet or on either surface, will be noticeable to the inspector.

An important feature of the invention is the provision of means, whereby the sheet, when over the illuminated field or field of vision, is momentarily stopped, thus not only making it possible to give a complete inspection, but further greatly lessening the strain on the eyes of the observer.

A further and important object is to provide means of a novel character, whereby the sheet, after its character is determined, can be passed to one of a plurality of deposit places, as a consequence of which the sheets are graded as "firsts", "seconds" or "discarded."

In the accompanying drawings:—

Figures 1 and 1ª are together a view in elevation of one side of the preferred embodiment of the apparatus, Figures 2 and 2ª are together a view in elevation of the opposite side of the apparatus, Figures 3 and 3ª are together a top plan view of the machine, Figure 4 is a sectional view on the line 4—4 of Figure 3, Figure 4ª is a sectional view on the line 4ª—4ª of Figure 3ª.

Figure 5 is a side elevation of the switch or deflector-operating mechanism on an enlarged scale.

Figure 6 is a plan view of a portion of the switch or deflector mechanism,

Figure 7 is a sectional view on the line 7—7 of Figure 6,

Figure 8 is a view in elevation of the gate-operating cam,

Figure 9 is a corresponding view of the driving member for said cam,

Figure 1:
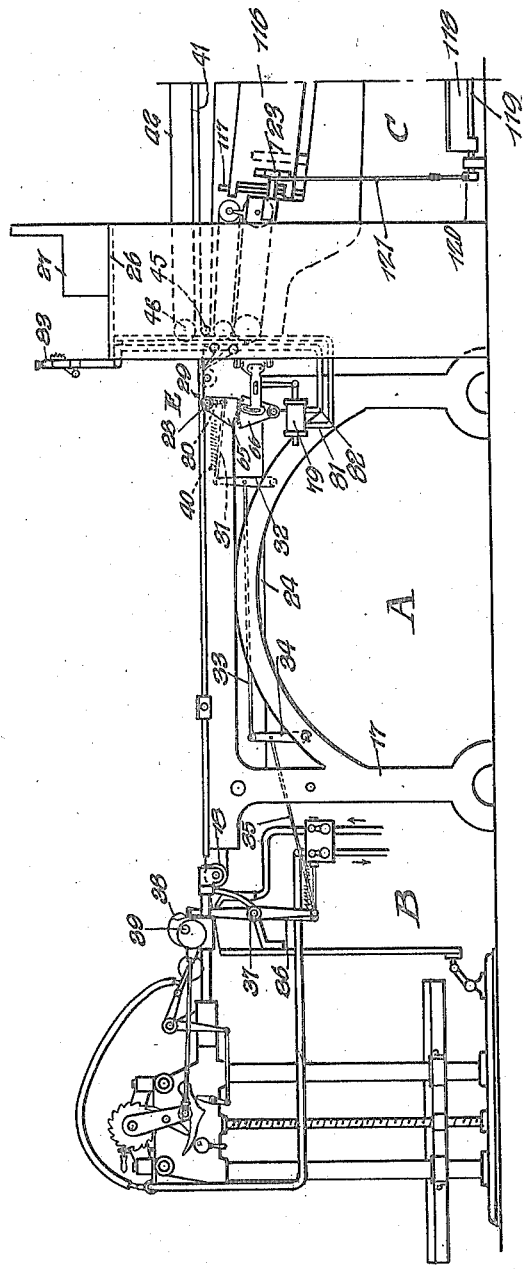
Figure 1A:
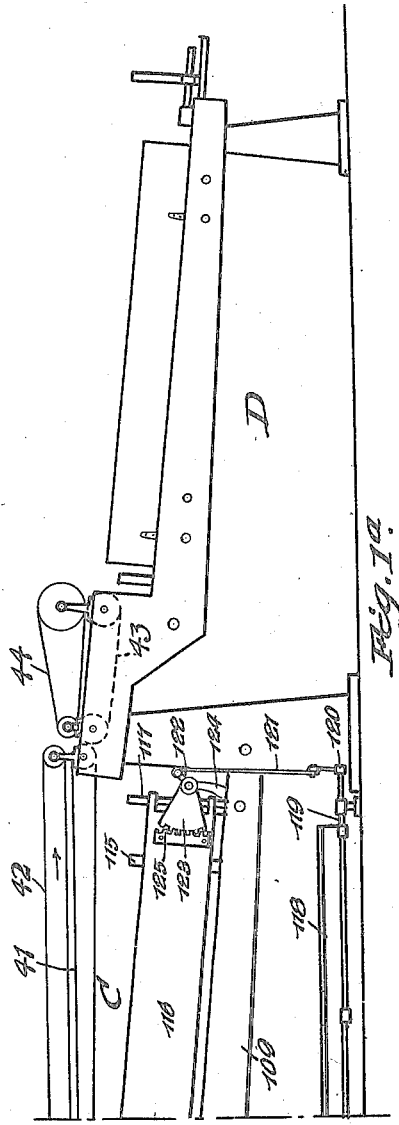

Figure 10 is a sectional view showing the gate-operating cam in its assembled engagement with its driver, Figure 11 is a side elevation of a portion of the gate, Figure 12 is a view in elvation of the switch or deflector controlling means, Figure 13 is a longitudinal sectional view through one of the controlling valves, Figure 14 is a perspective view of one of said valves and the associated mechanism, Figure 15 is a sectional view on the line 15—15 of Figure 5, Figure 16 is a cross sectional view through the intermediate lay boy.

Figure 17 is a detail view of the gate operating cam and lever.

In the embodiment disclosed, there is employed an inspecting mechanism, designated A, a feeding apparatus B for delivering sheets to the inspecting mechanism, an intermediate or first lay boy C, a second or end lay boy D, and switch or deflecting mechanism E, for delivering the sheets passing from the inspecting mechanism A, to either the lay boys C or D, or to a point of discard, designated F.

Considering first the inspecting mechanism A, a suitable frame is provided, designated generally 17, and having journaled at its ends rollers 18 and 19, around which pass endless conveyor elements, preferably in the form of cords 20. These cords are continuously driven by any suitable means. For example in Figure 2, there is shown a drive shaft 21 operated from any suitable source, as a motor, not shown, and through the change speed gearing 22 a pinion 23, fixed to the roller 18, is driven. By changing the ratio of the gears 22, obviously the roller 23 and consequently the surface feed of the cords, can be altered, as desired.

The sheets to be inspected are delivered on to the cords over the roller 18 from a feeder B. While various types of feeders may be employed, that preferably used is the one disclosed in my co-pending application, Serial No. 105,174, filed simultaneously herewith. It is believed to be unnecessary to an understanding of the present invention to go into detail regarding this feeder, beyond the statement that as usual it delivers sheets successively on the upper stretches of the cords 20, which carry them to the opposite end of the mechanism A.

Beneath the cords is a horizontal light reflecting plate 24, occupying a space substantially equal to the space between the rollers 18 and 19, and on this reflecting plate are placed rows of electric lamps 25, the light from which will obviously be directed upwardly against and through the sheets supported on the cords 20. For the convenience of the operator or inspector, a platform 26 is located in rear of and above the cords, and may have a suitable seat 27 for the operator.
Just in advance of the rear roller 19 is a sheet-stopping gate, consisting of a rock shaft 28, having upstanding fingers 29, adapted to pass between the cords, with their upper ends projecting above the same, thus constituting a stop for the sheets. This rock shaft 28 has a depending crank arm 30, to which is connected a link 31 that is in turn connected to a swinging arm 32, pivoted on the frame. This arm in turn has a link connection 33 with another arm 34 pivoted on the frame, and the arm 34 in turn has a link connection 35 with the lower end of a lever 36 fulcrumed between its ends, as shown at 37. The upper end of this arm 34 is operated against by a cam 38 mounted on a cam shaft 39, and driven by the change speed gearing 22. The cam 38 is rotatable on the cam shaft 39, but is provided with a pin 38$^a$ adapted to engage in any one of a plurality of openings 38$^b$, formed in an adjacent cam 38$^c$ fixed to the shaft 39. The cam 38$^c$ operates the suction-controlling valve of the feeder, as explained in the co-pending application above mentioned. The cam 38 is also slidable on the shaft 39, but is urged towards the cam 38$^c$ by a spring 38$^d$, coiled about the shaft and bearing against the cam. Obviously by disengaging the pin 38$^a$ from the cam 38$^c$, and turning the cam 38, this cam can be placed in different positions in order to vary the time of the gate-operating mechanism with respect to the delivery of sheets by the feeding means, so as to space the sheets a greater or less distance apart, as desired and allow for sheets of different sizes being delivered. It will thus be evident that as the cam 38 rotates through the link and lever mechanism described, the upstanding fingers 29 of the gate will be periodically moved to a rearward lowered position below the upper stretches of the cords, on which the sheets rest. The gate is returned to its active or upstanding position by a spring 40 connected to the arm 32.
From the above, it is believed that it will be clear that as the sheets are successively delivered by the feeder B on to the cords 20, they will be carried by said cords over the illuminated field, which constitutes a field of vision for the operator, and will successively strike the gate 29, where they will be momentarily stopped, giving the inspector an opportunity to view the entire sheet, while it is at a state of rest.
In order that the inspector may readily determine the size of the sheet, indicating pointers 38$^e$ are adjustably mounted on rods 38$^f$, located at the sides of the field and held by set screws 38$^g$. A third pointer 38$^h$ is adjustably mounted on a cross rod 38$^i$, which is adjustable on guideways 38$^j$ on the sides of the machine. Thus the size of each sheet may be readily determined, and the indicators adjusted for those of different areas. As soon as the gate drops, however, the sheet will pass on.

Directly in rear of the rear roller 19 is an upper conveyor, consisting of lower endless cords 41 and upper endless cords 42 that deliver to a corresponding set of lower tapes 43 and upper tapes 44. These tapes, in turn, feed the sheets that are received thereby to the end lay boy D, which lay boy may be of any suitable construction.

Directly beneath the front or receiving ends of the tapes 41 and 42, which at that end pass around rollers 45 and 46, are endless lower tapes 47 and coacting upper tapes 48 passing around rollers 49 and 50 beneath the rollers 45 and 46. These tapes 47 and 48 deliver into the intermediate lay boy C. The end lay boy D is preferably employed for perfect or best grade of sheets. The lay boy C is preferably employed for second grade sheets or those having certain slight defects. Sheets of a third class or those seriously defective may be dropped upon the floor at the point F. The following mechanism is employed for this purpose.

An upper rock shaft 51 is provided with a series of forwardly extending tapered switch points 52, the free ends of which are located just over the rear portion of the roller 19, and when in their depressed positions, are so located that a sheet passing the gate will ride over such points 52, and into the conveyor 41—42, as will be evident by reference particularly to Figure 7. A lower rock shaft 53 is located below the rock shaft 51, and is provided with a series of forwardly and upwardly inclined switch points 54, the free ends of which are directly adjacent to the free ends of the points 52, and are staggered with regard thereto, as shown in Figure 6.

Referring now particularly to Figure 5, the upper rock shaft 51 is provided with a depending crank arm 55 and a forwardly extending curved shoe 56. The lower rock shaft 53 is provided with a reversely arranged forwardly extending shoe 57 that is adapted to ride against the shoe 56, the latter constituting under certain circumstances, an actuating cam on the former, to cause the upward turning of the shaft 51 when the shaft 53 is turned. The shaft 53 also has a depending crank arm 58. These two crank arms 58 have forwardly extending reciprocatory slide rods, designated, respectively, 59 and 60, and each has a rearwardly swinging latch 61 and 62, the upper one extending downwardly, the lower one extending upwardly. These latches are held in their active positions by springs 63 and 64.

The rock shaft 28 of the gate is provided with a gear segment 65 that is in mesh with a second gear segment 66 below it, and in reverse direction thereto. This gear section 66 has an outstanding pin 67 engaged in the slot 68 of a reciprocatory actuating bar 69. This bar also is capable of swinging movement, being slidably mounted on an angular guide 70, a slot 71 being formed in the bar for the reception of the guide. The guide is pivotally mounted on a stud 72. The rear free end of the bar 69 is provided with an upper pin 73 adapted to engage behind the latch hook 61, when the bar is swung upwardly, while a lower pin 74 is correspondingly adapted to engage behind the lower latch hook 62, when the rear end of the bar 69 is swung downwardly.

The following mechanism is employed for effecting the swinging of said bar. The guide 70 has fast to it a depending crank arm 75, which arm is connected by link 76 with the rod 77 of a plunger piston 78 that operates in a cylinder 79, and has springs 80 in the cylinder bearing against opposite sides of the piston to normally hold the same centered, with the arm 75 in vertical position, and the rear end of the actuating bar 69 centrally disposed between the rods 59 and 60, with the pins 73 and 74, having paths that are not intersected by the latches 61 and 62.

From the cylinder 79 on opposite sides of the piston 78, extend two suction pipes 81 and 82, which as indicated by dotted lines between Figures 5 and 12, lead to a common connecting pipe 83, which as shown in Figure 1, is located on the front of the platform 26 in advance of the operator's seat 27. Centrally from the connecting pipe 83 a suction pipe 84 leads to an air suction pump, not shown, but of any suitable construction. Communication between the pipe 84 and the pipe 81 is controlled by a valve, designated generally 85, and corresponding communication between the suction pipe 84 and the pipe 82 is controlled by a valve 86. These valves are duplicates, and a sectional view of one is shown in Figure 13. Each valve consists of a casing 87 with a passageway 88, transversely therethrough, affording communication between the air suction pipe 84 and the pipe 81 or 82. A reciprocatory plunger valve 89 is located in the casing, and has an annular groove 90 that is movable into and out of alinement with the passageway 88, and normally it is out of such alinement, the valve being held elevated by a coiled spring 91 surrounding its upper end and bearing against the head 92, constituting a thumb piece for moving the valve downwardly. The three pipes 81, 82 and 84 are furthermore provided with vent ports 93 adapted to be covered and uncovered by disk valves 94 loosely mounted on the ends of crank arms 95. These crank arms are carried by a rock shaft 96 journaled on the pipes 81 and 82, and having other crank arms 97 that extend below the lower ends of the plunger valves 89 and have rounded heads 98 that are borne against by the lower ends of said plunger valves. Springs 99 serve to hold the heads 98 against the valves. When the valves are in closed position, or as illustrated in Figure 13, the ports 93 are opened as illustrated in Figure 14, and consequently air can flow freely through the pipe 84 to the pump, while the pipes 81—82 being opened to atmosphere, the piston 78 will obviously be in its central position.

While any suitable driving mechanism may be employed for the various sets of cords and tapes, in the apparatus described, an endless sprocket chain 100, driven from the roller 18, operates through sprockets 101, a second chain 102 that drives the tapes 47—48 through the medium of a sprocket 103. A second sprocket operated by the sprocket 103 drives another endless sprocket chain 104 that operates the conveyor cords 41—42. This sprocket chain 104 operates an additional sprocket chain 105 that drives the tapes 43—44. It also drives still another sprocket chain 106 that operates the shafts 107—108 that actuate the joggers of the two lay boys C and D.

As already stated the lay boy D may be of any desired character, and the lay boy C may also be of the usual character, except that being in an intermediate position, means are provided for removing the sheets from the side instead of the end as is the usual case with such sheet-receiving structures. For this purpose the frame 109 has slidably mounted on it a rear side wall 110 adjustably carried on reciprocating rods 111, which rods are connected by short links 112 to the yokes 113. Cams 114, are mounted on the shaft 107, and end joggers 115, mounted to operate in the usual manner, is located at the rear end of the lay boy. The front side wall is designated 116 and is vertically slidable on guide rods 117 located at its ends. A treadle 118, located below the wall 116, is carried by a rock shaft 119, having crank arms 120 at its ends, and these crank arms are connected by links 121 with arms 122 carried by segmental gears 123 journaled on brackets 124 on the frame. The gears 123 mesh with racks 125 fixed to the ends of the side wall 116. Obviously by pressing down on the treadle, the gears 123 will be swung in a direction to raise the wall 116 and give access to the lay boy.

The operation of the apparatus may be outlined as follows. Sheets are delivered one by one, and at a speed determined by their size and the ability of the operator to classify them, this operator being preferably located, as stated, on an elevated platform in the rear of the illuminated field. As each sheet is carried by the cords 20 across the field it strikes the gate 29, where it is brought to a standstill, so that its size can be determined by the indicators 38$^e$ and 38$^h$, and any defects noted. The operator can easily ascertain these various defects, and if the sheet is classified as "perfect," he takes no action. The gate therefore automatically drops and the sheet passes on over the switch points 52 and 54, which are lowered or in the position illustrated in Figure 7, and thus enter between and are carried off by the conveyor cords 41—42. They then pass to the tapes 43—44 and are delivered into the rear lay boy D. If some minor defect appears that does not completely ruin the sheet for commercial purposes, but is classed as a second, while it is at a standstill held by the gate 29, the operator depresses the valve 86 (see Figure 12). The first action resulting from this movement is to swing the rock shaft 96, which closes all the vent ports 93, after which the suction pipe 84 is opened to the suction pipe 82. As a consequence, considering now Figure 5, air is exhausted from the right hand end of the cylinder 79 and the piston 78 moves to the right. The consequence is that the crank arm 75 is swung, thereby swinging the rear end of the actuating bar 69 upwardly, so that its upper pin 73 will engage the latch 61. Consequently as the gate swings to its inoperative position the gear segment 65 that moves with it, will operate the segment 66, and draw the operating bar forwardly. This operation causes a corresponding movement of the rod 59 and the elevation of the upper switch points 52. The sheet therefore will be diverted downwardly, and riding on the lower points 54, will be carried by the tapes 47—48 into the intermediate lay boy C. If a badly damaged sheet is delivered, which is utterly useless, or is only valuable for cutting it into smaller sizes, for example, the operator opens the left hand valve 85, whereupon the vents 93 are again closed, but now the left hand pipe 81 is connected to the air suction pipe 84, and the piston 78 is moved to the left. The operating bar 69 is consequently depressed. As a consequence the lower rod 60 is now engaged by the pin 74, and this causes the elevation of the lower switch points 54. At the same time the lower shoe 57 rides on the shoe 56, and causes the upper switch points 52 to be elevated. The sheet is therefore directed by the lower switch points downwardly in advance of the tapes 47—48, and on the floor into the space F beneath the lay boy C.

In this structure, one of the outstanding features is the mechanism whereby the sheets are brought to a standstill. This makes it possible not only to accurately determine their size, but to easily ascertain if there are any defects, and this is accomplished without the eye strain that is occasioned by endeavoring to inspect rapidly travelling sheets. Moreover it has been found that aside from greater accuracy obtained the sheets can be inspected with great rapidity.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim is:

1. In apparatus of the character set forth, the combination with a field, and means for illuminating the same, of substantially horizontal coacting conveyor cords extending across and moving over said field, and means for automatically feeding sheets successively upon the cords to cause said cords to carry said sheets successively over the field.

2. In apparatus of the character set forth, the combination with a supporting frame, of a plurality of lamps located therein, endless carrier belts operating over said lamps, an automatic feeder delivering to the belts at one end, and means for supporting an inspector above the carrier belts and adjacent to the other end.

3. In apparatus of the character set forth, the combination with an illuminated inspection field, of means for positioning articles to be inspected successively on the inspection field and moving them therefrom, and means for causing them to be temporarily held against movement while on said inspection field.

4. In apparatus of the character set forth, the combination with an illuminated inspection field, of means for causing sheets to successively traverse the same and be removed therefrom, and means for causing each sheet to be stopped for inspection while on the said field.

5. In apparatus of the character set forth, the combination with an illuminated inspection field, of a conveyor for causing sheets to traverse the field, and means that engages the sheets to stop them on the field.

6. In apparatus of the character set forth, the combination with an illuminated inspection field, of a conveyor for causing sheets to traverse the field, and a gate movable into and out of the path of the sheets to temporarily stop them on the field.

7. In apparatus of the character set forth, the combination with an inspection field and means for illuminating the same from beneath, of means for moving articles to be examined over such illuminated field, and a gate at the discharge end of the field for stopping the sheets on said field and in the range of illumination.

8. In apparatus of the character set forth, the combination with an inspection field and a conveyor for causing articles to traverse the same, of means beneath the conveyor for illuminating the field, means for feeding sheets to be inspected successively to the conveyor at one end, and a gate at the other end movable into and out of the path of the articles carried by the conveyor.

9. In apparatus of the character set forth, the combination with a conveyor comprising upper and lower sets of endless carriers, of lamps located beneath the same to illuminate the sheets transported by the conveyor, a feeding apparatus for delivering sheets successively to the conveyor at one end, and a gate located at the other end and movable into and out of the path of the sheets carried by the conveyor for stopping said sheets in the range of illumination of the lamps.

10. In apparatus of the character set forth, the combination with an inspection field and means for illuminating the same, of means for carrying sheets to a position to be illuminated and inspected on said field, means for stopping the sheets when on the field, and mechanism for automatically operating the stopping means to permit the sheets to pass from the field.

11. In apparatus of the character set forth, the combination with an inspection field and means for illuminating it, of means for causing articles to be inspected to traverse the field, a gate movable into the path of the articles to stop the same when on the field and in the range of illumination, and means for periodically operating the gate to release the articles and permit them to pass from the field.

12. In apparatus of the character set forth, the combination with a sheet conveyor, of means for causing light to pass outwardly therethrough, a gate at the rear end of the illuminating means movable into and out of the path of articles carried by the conveyor, for stopping the said articles and then releasing them to permit their continued movement, and automatic means for periodically operating the gate.

13. In apparatus of the character set forth, the combination with a conveyor and means on the inner side of the same for causing light to pass outwardly therethrough, means for feeding sheets successively to the conveyor to be transported thereby across the lights, a gate at the outgoing end of the lighting means and movable into and out of the path of the sheets to stop the same in the range of light, and means for operating with the feeder for actuating the gate.

14. In apparatus of the character set forth, the combination with a conveyor and means on the inner side of the same for causing light to pass outwardly therethrough, means for feeding sheets successively to the conveyor to be transported thereby across the lights, a gate at the outgoing end of the lighting means and movable into and out of the path of the sheets to stop the same in the range of light, a cam operating with the feeding means, and means actuated by the cam for periodically moving the gate.

15. In apparatus of the character set forth, the combination with a conveyor and means on the inner side of the same for causing light to pass outwardly therethrough, means for feeding sheets successively to the conveyor to be transported thereby across the light, a gate at the outgoing end of the lighting means and movable into and out of the path of the sheets to stop the same in the range of light, a driving shaft operating with the feeder, a cam rotatable with respect to the shaft, means for securing the cam in different relations on the shaft, and means operated by the cam for periodically moving the gate.

16. In apparatus of the character set forth, the combination with a frame, of an endless conveyor operating in the upper portion of the frame, illuminating means in the frame for causing an illuminated inspection field that is traversed by the conveyor, a feeder at the receiving end of the conveyor for delivering sheets successively thereto, a gate at the delivery end of the conveyor movable into and out of the path of the sheets, and means operating with the feeder for automatically and periodically moving the gate.

17. In apparatus of the character set forth, the combination with a conveyor and means on the inner side of the same for causing light to pass outwardly therethrough, means for feeding sheets successively to the conveyor to be transported thereby across the light, a rock shaft at the delivery end of the conveyor, a gate carried by the rock shaft and movable into and out of the path of sheets on the conveyor for holding the sheets in the range of light, a cam rotating with the feeding means, a lever actuated by the cam, and connections between the lever and the rock shaft for moving the same periodically to operate the gate.

18. In apparatus of the character set forth, the combination with a conveyor, of means for passing light across the conveyor to illuminate sheets carried thereby, said conveyor having movable portions traversing the field of illumination, and means at the delivery end of the conveyor and at the rear end of the field of illumination for directing the sheets into different paths.

19. In apparatus of the character set forth, the combination with an inspection field and means for illuminating the same, of means for causing sheets to be inspected to traverse said field, a switch for deflecting the sheets into a predetermined path, a second switch for deflecting the sheets into a second path, and means for operating both switches simultaneously to cause the sheets to be deflected into said second path.

20. In apparatus of the character set forth, the combination with an inspection field and means for illuminating the same, of means for causing sheets to be inspected to traverse said field, a switch for deflecting the sheets into a predetermined path, a second switch for deflecting the sheets into a second path, and means for causing one switch to move independently of the other to direct sheets into one path and for causing both switches to move simultaneously to deflect sheets into the other path.

21. In apparatus of the character set forth, the combination with an inspection field and means for illuminating the same, of means for causing sheets to be inspected to traverse said field, a switch for deflecting the sheets into a predetermined path, a second switch for deflecting the sheets into a second path, one of said switches being below the other, means for elevating the upper switch to deflect sheets passing over the lower switch into a predetermined path, and means for elevating both switches simultaneously to deflect sheets into a different path beneath both switches.

22. In apparatus of the character set forth, the combination with an endless conveyor, and means for causing a light to shine therethrough and illuminate articles carried by the conveyor, a pair of switches mounted to move upwardly and both having their front ends directly at the discharge end of the conveyor, and mechanism for elevating one of the switches individually and for elevating both switches simultaneously.

23. In apparatus of the character set forth, the combination with an endless conveyor and means for causing a light to shine therethrough and illuminate articles carried by the conveyor, two rock shafts located at the delivery end of the conveyor and located one below the other, forwardly extending switch points carried by the respective rock shafts and having their free ends adjacent to the conveyor, and means for turning the upper rock shaft alone and for turning the two simultaneously to correspondingly elevate the switch points carried thereby.

24. In apparatus of the character set forth, the combination with an endless conveyor and means for causing a light to shine therethrough and illuminate articles carried by the conveyor, two rock shafts located at the delivery end of the conveyor and located one below the other, forwardly extending switch points carried by the respective rock shafts and having their free ends adjacent to the conveyor, means for operating each rock shaft individually, and means for causing the lower rock shaft to operate the upper rock shaft.

25. In apparatus of the character set forth, the combination with an endless conveyor and means for causing a light to shine therethrough and illuminate articles carried by the conveyor, two rock shafts located at the delivery end of the conveyor and located one below the other, forwardly extending switch points carried by the respective rock shafts and having their free ends adjacent to the conveyor, devices connected to each rock shaft, means for operating on said devices to turn the shafts and thereby elevate the respective switch points, and cam shoes carried by the rock shafts and having bearing engagements to cause the turning of one of the rock shafts when the other is turned.

26. In apparatus of the character set forth, the combination with an endless conveyor and means for causing a light to shine therethrough and illuminate articles carried by the conveyor, two rock shafts located at the delivery end of the conveyor and located one below the other, forwardly extending switch points carried by the respective rock shafts and having their free ends adjacent to the conveyor, a crank arm carried by each rock shaft, means engaged with the crank arms for swinging the same and thereby turning the rock shafts individually, a pair of cam shoes carried by the rock shafts, one of said cam shoes moving with its rock shaft out of and into bearing engagement with the other cam shoe, and said other cam shoe operating on the first mentioned cam shoe to cause it and its rock shaft to turn therewith.

27. In apparatus of the character set forth, the combination with an inspection field and means for delivering to said field, sheets to be inspected, of a pair of switches over which the sheets are adapted to pass, means for operating one of the switches to cause sheets to pass over the other, and means for operating both switches to cause the sheets to pass beneath both.

28. In apparatus of the character set forth, the combination with an inspection field and means for delivering to said field, sheets to be inspected, of a pair of switches for respectively directing sheets into different paths, a switch actuating member having an actuating movement and a coupling movement in different directions, and means for effecting the latter movement to connect the actuating member to either switch.

29. In apparatus of the character set forth, the combination with an inspection field, and means for delivering to said field, sheets to be inspected, of a pair of switches for respectively directing sheets into different paths, actuated coupling elements connected to the switches, a common actuating member having an actuating movement in one direction and a coupling movement in a different direction, and means for moving the member in one direction to cause the latter to engage either of the coupling elements and thereafter moving the actuating member in said different directions to move the coupling element connected thereto.

30. In apparatus of the character set forth, the combination with an inspection field and means for delivering to said field, sheets to be inspected, of a pair of switches for respectively directing sheets into different paths, actuated coupling elements connected to the switches, a common actuating member, and means for moving the actuating member in a predetermined direction to effect an actuating movement and shifting it transversely to said direction to positions where it will engage either coupling element to thereby operate either switch.

31. In apparatus of the character set forth, the combination with an inspection field and means for delivering to said field, sheets to be inspected, of a pair of switches for respectively directing sheets into different paths, actuated coupling elements connected to the switches, a common actuating member, means for reciprocating the actuating member, and means for swinging it to positions to engage either coupling element to thereby operate either switch.

32. In apparatus of the character set forth, the combination with an inspection field and means for delivering to said field, sheets to be inspected, of switches for directing sheets from said field into different paths, an actuating member for said switch, and pneumatic means for causing the actuating member to be coupled to either switch.

33. In apparatus of the character set forth, the combination with an inspection field and means for delivering to said field, sheets to be inspected, of switches for directing sheets from said field into different paths, an actuating member for said switch, means for operating the actuating member, and pneumatic means for shifting the actuating member to positions to engage and move either switch.

34. In apparatus of the character set forth, the combination with an inspection field and means for delivering to said field, sheets to be inspected, of switches for directing sheets from said field into different paths, an actuating member for said switch, means for operating the actuating member, a cylinder, a piston in the cylinder, means operated by the piston for shifting the actuating member to positions to engage and move either switch, and means for causing fluid in the cylinder to move the piston in either direction.

35. In apparatus of the character set forth, the combination with an inspection field and means for delivering to said field, sheets to be inspected, of switches for directing sheets from said field into different paths, an actuating member for said switch, means for operating the actuating member, pneumatic means for shifting the actuating member to positions to engage and move either switch, said means including a cylinder and a piston therein, a pneumatic pump, conduits between the pump and the cylinder on opposite sides of the piston, and means for controlling the passage of fluid through the conduits.

36. In apparatus of the character set forth, the combination with an inspection field and means for delivering to said field, sheets to be inspected, of switches for directing sheets from said field into different paths, an actuating member for said switch, means for operating the actuating member, pneumatic means including a cylinder and a piston therein for shifting the actuating member to positions to engage and move either switch, a pneumatic pump, conduits between the pump and the cylinder on opposite sides of the piston, and manually operated valves in the conduits for controlling the passage of fluid through the conduits.

37. In apparatus of the character set forth, the combination with an inspection field, of means for carrying thereover, sheets to be inspected, means for stopping said sheets on the inspection field, and means behind the stopping means for directing sheets released by said means into different paths.

38. In apparatus of the character set forth, the combination with an inspection field, of means for carrying thereover, sheets to be inspected, means for stopping said sheets on the inspection field, and means actuated with the stopping means for directing sheets released by said means into different paths.

39. In apparatus of the character set forth, the combination with an inspection field, of means for carrying thereover sheets to be inspected, a movable gate for stopping the sheets on the inspection field, and a switch mechanism for determining the destinations of the sheets released by the gate.

40. In apparatus of the character set forth, the combination with an inspection field, of means for carrying thereover sheets to be inspected, a movable gate for stopping the sheets on the inspection field, means for moving the gate, a switch mechanism for determining the destinations of the sheets released by the gate, and means operating with the gate to operate the switch mechanism.

41. In apparatus of the character set forth, the combination with an inspection field, of means for carrying thereover sheets to be inspected, a movable gate for stopping the sheets on the inspection field, means for moving the gate, a switch mechanism for determining the destinations of the sheets released by the gate, and means operated by the gate to operate the switch mechanism.

42. In apparatus of the character set forth, the combination with an inspection field, of means for carrying thereover sheets to be inspected, a movable gate for stopping the sheets on the inspection field, a switch mechanism for determining the destinations of the sheets released by the gate, a switch actuating device operated by the gate, and means for connecting the actuating device to and disconnecting it from the switch mechanism.

43. In apparatus of the character set forth, the combination with an inspection field, of means for carrying thereover sheets to be inspected, a movable gate for stopping the sheets on the inspection field, a switch mechanism for determining the destinations of the sheets released by the gate, a switch actuating device operated by the gate, and manually controlled pneumatic means for connecting the actuating device to and disconnecting it from the switch mechanism.

44. In apparatus of the character set forth, the combination with an inspection field, and means for carrying sheets thereover to be inspected, a gate movable to and from a position in the path of the sheets to stop the same on the inspection field, means for periodically operating the gate, a switch mechanism behind the gate to direct the sheets to different destinations, a device operated with the gate, and means for causing the device to be coupled to the switch mechanism to operate the latter.

45. In apparatus of the character set forth, the combination with an inspection field, and means for carrying sheets thereover to be inspected, a gate movable to and from a position in the path of the sheets to stop the same on the inspection field, means for periodically operating the gate, a pair of switches behind the gate to direct the sheets to different destinations, a device operated with the gate, and means for causing the device to be coupled to either switch to operate the same.

46. In apparatus of the character set forth, the combination with an inspection field, and means for carrying sheets thereover to be inspected, a rocking gate movable to and from a position in the path of the sheets to stop the same on the inspection field, means for periodically rocking the gate, a switch mechanism behind the gate to direct the sheets to different destinations, a reciprocatory device operated with the gate, and means for swinging the device to cause it to be coupled to the switch mechanism to operate the latter.

47. In apparatus of the character set forth, the combination with a sheet conveyor, of means for illuminating sheets carried by the conveyor, a rocking gate for stopping the sheets carried by the conveyor, a pair of upwardly swinging switches behind the gate for determining the destinations of the sheets, having associated cam shoes, a reciprocatory switch actating device connected to and operated by the gate, and capable of swinging movement to connect with either switch, a pneumatic device for swinging the actuating device, and manual means for controlling the operation of the pneumatic device.

48. In apparatus of the character set forth, the combination with sheet inspecting means, of a rear lay boy, a conveyor for carrying sheets to the rear lay boy, an intermediate lay boy beneath the conveyor and having a movable side wall, means for moving the side wall to give access to the lay boy, and a switch for directing sheets from the inspection means beneath the conveyor and to the intermediate lay boy.

In testimony whereof, I affix my signature.

ALBERT BROADMEYER.